United States Patent
Akamatsu et al.

(10) Patent No.: US 8,741,792 B2
(45) Date of Patent: Jun. 3, 2014

(54) GLASS COMPOSITION AND SEALING MATERIAL

(75) Inventors: Takafumi Akamatsu, Amagasaki (JP); Yoshitaka Mayumi, Amagasaki (JP)

(73) Assignee: Nihon Yamamura Glass Co., Ltd., Amagasaki-shi (JP)

( * ) Notice: Subject to any disclaimer, the term of this patent is extended or adjusted under 35 U.S.C. 154(b) by 2 days.

(21) Appl. No.: 13/580,519

(22) PCT Filed: Feb. 24, 2011

(86) PCT No.: PCT/JP2011/054194
§ 371 (c)(1), (2), (4) Date: Aug. 22, 2012

(87) PCT Pub. No.: WO2011/105519
PCT Pub. Date: Sep. 1, 2011

(65) Prior Publication Data
US 2012/0316052 A1 Dec. 13, 2012

(30) Foreign Application Priority Data
Feb. 24, 2010 (JP) ................................. 2010-039086

(51) Int. Cl.
*C03C 8/02* (2006.01)
*C03C 8/14* (2006.01)

(52) U.S. Cl.
USPC .................................. 501/15; 501/17; 501/21

(58) Field of Classification Search
USPC ............................................... 501/15, 17, 21
See application file for complete search history.

(56) References Cited

U.S. PATENT DOCUMENTS

| | | | | |
|---|---|---|---|---|
| 4,749,665 A | * | 6/1988 | Yano et al. | 501/32 |
| 6,270,880 B1 | * | 8/2001 | Kawakami et al. | 428/210 |
| 6,444,598 B1 | * | 9/2002 | Kawakami et al. | 501/32 |
| 7,964,523 B2 | * | 6/2011 | Mayumi et al. | 501/77 |
| 7,989,374 B2 | * | 8/2011 | Drake et al. | 501/21 |
| 8,288,298 B2 | * | 10/2012 | Mayumi et al. | 501/15 |
| 2006/0019813 A1 | | 1/2006 | Yoshii | |
| 2011/0053753 A1 | | 3/2011 | Mayumi et al. | |

FOREIGN PATENT DOCUMENTS

| | | |
|---|---|---|
| JP | 2000016837 A | 1/2000 |
| JP | 200656769 | 3/2006 |
| JP | 2007161569 | 6/2006 |
| JP | 2008120648 | 5/2008 |
| JP | 2009046371 | 3/2009 |

* cited by examiner

*Primary Examiner* — Karl Group
(74) *Attorney, Agent, or Firm* — The Webb Law Firm

(57) ABSTRACT

Provided is a glass composition that has a low reactivity with the constituent materials forming a solid oxide fuel cell while having a thermal expansion coefficient suitable for sealing a solid oxide fuel cell, and a glass composition and sealing material that are suitable for sealing a solid oxide fuel cell. The present invention, which relates to a sealing glass composition, is a sealing glass composition used for sealing a solid oxide fuel cell, characterized by having a composition ratio of, expressed in terms of oxide, 40 to 55% by mass of $SiO_2$, 0 to 5.0% by mass of $Al_2O_3$, 0 to 8.0% by mass of $B_2O_3$, 20 to 30% by mass of MgO, and 10 to 24% by mass of CaO, wherein a total of the MgO and the CaO is 40 to 54% by mass.

7 Claims, No Drawings

GLASS COMPOSITION AND SEALING MATERIAL

TECHNICAL FIELD

The present invention relates to a glass composition used in application of sealing a solid oxide fuel cell (SOFC), and a sealing material used for sealing a solid oxide fuel cell.

BACKGROUND ART

Conventionally, glass powder has been widely used for adhering metal members together, ceramic members together, or a metal member with a ceramic member by melting the glass powder.

For example, since a solid oxide fuel cell usually requires an operation temperature of 800° C. to 1,000° C., glass known as crystallized glass has been used for the sealing between cells and metal members to be attached thereto.

More specifically, for example, such glass powder is used when producing a solid oxide fuel cell in the following manner. A glass powder is formed from a glass composition that can crystallize by sintering under predetermined temperature conditions. A sealing material containing this glass powder is filled between members that need to be sealable and the glass powder is sintered to have a sintered body formed from the crystallized glass formed between these members, thereby sealing them.

Since this type of crystallized glass generally exhibits little crystal phase transformation due to the sintering temperature, and has high thermal expansion properties and high strength, it can be said to be a material suitable for sealing a solid oxide fuel cell.

Regarding this point, for example, Patent Documents 1 and 2 mentioned below describe a glass composition with which the sintered crystallized glass exhibits a high thermal expansion coefficient even in a high temperature region, and describe that such a glass composition is suitable for application of sealing a solid oxide fuel cell.

A solid oxide fuel cell has cells in which an electrolyte material formed from a ceramic porous body is sandwiched by an anode material and a cathode material. Generally, a composite material of a nickel oxide and a ceramic is used as the anode material. As the cathode material, LSM (lanthanum strontium manganite), LSC (lanthanum strontium cobaltite), SSC (samarium strontium cobaltite), LSCF (lanthanum strontium cobalt ferrite) and the like are used.

Further, when trying to increase the power output by forming a stack obtained by laminating the cells thus constituted with an interconnector arranged between them, there is a case in which LSCF is used as the material forming the interconnector.

Therefore, for a glass composition used for sealing a solid oxide fuel cell, it is desirable to consider not only thermal expansion coefficient of the obtained glass, but also the reactivity with these materials.

However, studies on conventional sealing glass compositions showed that little consideration has been given to the reactivity with these materials, and there is no glass composition heretofore found, which suppresses the reactivity with the materials forming a solid oxide fuel cell, while at the same time having a thermal expansion coefficient suitable for sealing a solid oxide fuel cell.

CITATION LIST

Patent Documents

Patent Document 1: Japanese Patent Laid-Open No. 2007-161569
Patent Document 2: Japanese Patent Laid-Open No. 2009-46371

SUMMARY OF INVENTION

Technical Problem

It is an object of the present invention to, in view of the above-described problems, provide a glass composition that has a low reactivity with constituent materials forming a solid oxide fuel cell while at the same time having a thermal expansion coefficient suitable for sealing a solid oxide fuel cell, and hence provide a sealing material suitable for sealing a solid oxide fuel cell.

Solution to Problem

The present invention, which relates to a sealing glass composition for resolving the above-described problems, is a sealing glass composition used for sealing a solid oxide fuel cell, having a composition ratio of, expressed in terms of oxide, 40 to 55% by mass of $SiO_2$, 0 to 5.0% by mass of $Al_2O_3$, 0 to 8.0% by mass of $B_2O_3$, 20 to 30% by mass of MgO, and 10 to 24% by mass of CaO, wherein a total of the MgO and the CaO is 40 to 54% by mass.

Further, the present invention, which relates to a sealing material for resolving the above-described problems, is a sealing material used for sealing a solid oxide fuel cell battery, including a glass powder that is formed from a glass composition having a composition ratio of, expressed in terms of oxide, 40 to 55% by mass of $SiO_2$, 0 to 5.0% by mass of $Al_2O_3$, 0 to 8.0% by mass of $B_2O_3$, 20 to 30% by mass of MgO, and 10 to 24% by mass of CaO, wherein a total of the MgO and the CaO is 40 to 54% by mass.

Advantageous Effects of Invention

Since the glass composition according to the present invention includes components such as those described above in predetermined ratios, the glass composition has a thermal expansion coefficient suitable for sealing a solid oxide fuel cell and also can suppress the reactivity with the constituent materials forming the solid oxide fuel cell.

Specifically, according to the present invention, a sealing glass composition and a sealing material can be provided, which are suitable for sealing a solid oxide fuel cell.

The glass composition according to the present invention preferably has a difference between a glass softening point (Ts) and a crystallization peak temperature (Tx) of 90° C. or more.

By having such a preferred composition, fluidity during the sintering improves, so that the sealing operation can be carried out more easily.

Further, in the sealing material according to the present invention, the glass powder has an average particle size of preferably 7 to 40 μm, and more preferably 7 to 10 μm.

By adjusting the average particle size to this level, a glass powder having a preferred behavior during the sintering can be obtained, fluidity during the sintering can be prevented from becoming insufficient due to immature start of crystallization, and the ratio of the glass phase in the sintered crystallized glass can be prevented from becoming too large.

In addition, from the perspective of adjusting the strength and the thermal expansion coefficient of the sintered body formed by sintering the sealing material, it is preferred that the sealing material according to the present invention contains a ceramic powder in addition to the glass powder. In this case, it is preferred that the proportion of the glass powder is 95% by mass or more to less than 100% by mass and the proportion of the ceramic powder is more than 0% by mass to 5% by mass or less, based on the total amount of the glass powder and the ceramic powder.

Containing such a ceramic powder can facilitate adjustment of the strength and the thermal expansion coefficient of the sintered body (the composite formed from the crystallized glass and the ceramic powder).

DESCRIPTION OF EMBODIMENTS

A glass composition for sealing and a sealing material according to the present invention will be described below.

Examples of the sealing material according to the present embodiment include a material formed only from a glass powder obtained by crushing a raw glass formed from a predetermined sealing glass composition, or a material that includes a ceramic powder in addition to this glass powder.

This glass powder can give the sintered crystallized glass a predetermined thermal expansion coefficient. From the perspective that reactions with LSCF and the like during the sintering can be suppressed, it is important that the glass powder is formed from a glass composition that has the following component composition.

Specifically, it is important that the sealing glass composition according to the present embodiment has a composition ratio of, expressed in terms of oxide, 40 to 55% by mass of $SiO_2$, 0 to 5.0% by mass of $Al_2O_3$, 0 to 8.0% by mass of $B_2O_3$, 20 to 30% by mass of MgO, and 10 to 24% by mass of CaO, wherein the total of the MgO and the CaO is 40 to 54% by mass.

The respective components in the sealing glass composition will now be described.

The $SiO_2$ in the sealing glass composition according to the present embodiment is a glass-network-forming component that improves the stability of the glass during production of the raw glass and that is also an effective and essential component in producing high expansion $CaO$—$MgO$—$SiO_2$-based crystals (diopside etc.) during the sintering carried out after powderization.

A glass composition that precipitates mainly $CaO$—$MgO$—$SiO_2$-based (diopside, etc.) and $MgO$—$SiO_2$-based (enstatite, forsterite, etc.) crystals tends to exhibit little crystal phase transformation due to the sintering temperature and a post-crystallization glass strength that is more stable.

On the other hand, if crystals precipitate in the raw glass, the glass powder obtained by crushing such a raw glass tends to start crystallization earlier during the sealing and sintering, which can result in problems such as an inhibited flow due to deterioration in the fluidity of the composition soon after the sintering starts, and gaps being formed between the sintered body and the sealing target. Therefore, such a raw glass is not preferred.

The reason why the above-described range is set for the $SiO_2$ content in the sealing glass composition according to the present embodiment is based on this perspective. Further, the above-described lower limit is set because if the $SiO_2$ content is less than 40% by mass, high expansion $CaO$—$MgO$—$SiO_2$ based crystals (diopside etc.) may not be sufficiently produced during the sintering carried out after powderization.

In addition, if the $SiO_2$ content is less than 40% by mass, the precipitation of $CaO$—$MgO$—$SiO_2$-based (diopside etc.) and $MgO$—$SiO_2$-based (enstatite, forsterite etc.) crystals having little crystal phase transformation is insufficient. Consequently, a chemical reaction with the oxide electrode material may occur more easily.

The above-described upper limit is set because if the $SiO_2$ content exceeds 55% by mass, as a result of containing a large amount of $SiO_2$ the content of the CaO and the MgO is relatively decreased, which can prevent high expansion $CaO$—$MgO$—$SiO_2$-based (diopside etc.) and $MgO$—$SiO_2$-based (enstatite, forsterite etc.) crystals from being sufficiently produced.

Therefore, the $SiO_2$ content is usually set at 40% by mass or more, preferably 42% by mass or more, and more preferably 45% by mass or more.

Further, the $SiO_2$ content is usually set at 55% by mass or less, preferably 53% by mass or less, more preferably 52% by mass or less, and most preferably 51% by mass or less.

Specifically, the content of the $SiO_2$ in the sealing glass composition according to the present embodiment is usually set at 40 to 55% by mass, preferably 40 to 53% by mass, and more preferably 40 to 52% by mass.

It is especially preferred to set this content to 42 to 52% by mass, and most preferred is 45 to 51% by mass.

The $Al_2O_3$ in the sealing glass composition according to the present embodiment is a component that aids in improving stability during production of the raw glass, adjusting the crystallization start temperature, and maintaining the adhesive strength with the metal.

However, if the $Al_2O_3$ content exceeds 5% by mass, a large amount of glass phase remains after the sintering, so that the linearity of the thermal expansion curve deteriorates. Therefore, an $Al_2O_3$ content of more than 5% by mass is not preferable.

Therefore, the $Al_2O_3$ content is usually 0% by mass or more, preferably 0.5% by mass, more preferably 2% by mass or more, and especially preferably 3% by mass or more.

Further, the $Al_2O_3$ content is usually 5% by mass or less.

Specifically, the content of the $Al_2O_3$ in the sealing glass composition according to the present embodiment is usually set at 0 to 5% by mass, preferably 0.5 to 5% by mass, more preferably 1 to 5% by mass, and especially preferably 2 to 5% by mass.

The $B_2O_3$ in the sealing glass composition according to the present embodiment is a glass-network-forming component that improves the stability of the glass during production of the raw glass, and that is also an effective and essential component in producing high expansion $MgO$—$B_2O_3$-based crystals by reducing the crystallization temperature of the glass during the sintering carried out after powderization.

The reason why the above-described range is set for the $B_2O_3$ content is because if the $B_2O_3$ content exceeds 8% by mass, the amount of residual glass phase that does not crystallize during the sintering increases, so that the linearity of the thermal expansion curve deteriorates.

Further, if the $B_2O_3$ content exceeds 8% by mass, crystals having a melting temperature of 1,100° C. or less precipitate, so that a chemical reaction with the oxide electrode material may occur more easily. Therefore, a $B_2O_3$ content of more than 8% by mass is not preferable.

Thus, the $B_2O_3$ content is usually set at 8.0% by mass or less, preferably 6.0% by mass or less, and more preferably 5.5% by mass or less.

Therefore, the content of the $B_2O_3$ in the present embodiment is usually set at 0 to 8.0% by mass, preferably 0 to 6.0% by mass, and especially preferably 0 to 5.5% by mass.

The MgO in the sealing glass composition according to the present embodiment is an essential component in producing high expansion $MgO$—$B_2O_3$-based, $CaO$—$MgO$—$SiO_2$-based, and $MgO$—$SiO_2$-based crystals.

The reason why the above-described range is set for the MgO content in the present embodiment is because if the MgO content is less than 20% by mass, the degree of crystallization of the crystallized glass after the sealing and sintering is not sufficient, so that the residual ratio of the glass phase based on the crystal phase increases.

Further, if the MgO content is less than 20% by mass, the high expansion MgO—$B_2O_3$-based, CaO—MgO—$SiO_2$-based, and MgO—$SiO_2$-based crystals do not sufficiently precipitate, so that the thermal expansion coefficient of the glass sintered body tends to deteriorate. Therefore, the content of MgO of less than 20% by mass is not preferable.

On the other hand, if the MgO content exceeds 30% by mass, stability during production of the raw glass deteriorates, and flow is inhibited due to a deterioration in the fluidity during the sintering of the glass powder. Therefore, the content of MgO of more than 30% by mass is not preferable.

Therefore, the lower limit for the MgO content is usually set at 20% by mass, and preferably 22% by mass.

Further, the upper limit is usually set at 30% by mass, and preferably 29% by mass.

Specifically, the content of the MgO in the present embodiment is usually set at 20 to 30% by mass, preferably 22 to 30% by mass, and more preferably 22 to 29% by mass.

The CaO in the sealing glass composition according to the present embodiment is an essential component in producing high expansion CaO—MgO—$SiO_2$-based crystals.

The reason why the above-described range is set for the CaO content in the present embodiment is because if the CaO content is less than 10% by mass, the residual ratio of the glass phase based on the crystal phase increases without a sufficient improvement in the degree of crystallization after the sealing and sintering, so that a heat resistance suited to the sealing of a solid oxide fuel cell may not be given.

On the other hand, the reason why the upper limit is set at 24% by mass is because if the content exceeds 24% by mass, crystals having a melting temperature of 980° C. or less tend to precipitate, which can not only prevent the sintered body from exhibiting a sufficient strength, but can also make it easier for a reaction with the oxide electrode to occur.

Therefore, the lower limit for the CaO content is usually set at 10% by mass, and preferably 13% by mass.

Further, the upper limit is usually set at 24% by mass, preferably 16% by mass, and especially preferably 15% by mass.

Specifically, the content of the CaO in the present embodiment is usually set at 10 to 24% by mass, preferably 10 to 16% by mass, and especially preferably 10 to 15% by mass.

It is important that the MgO and CaO contents are not only as defined above, but also that the total content of these components is 40% by mass or more to 54% by mass or less.

The reason why it is important that the total of the MgO content and the CaO content is in the above-described range is because if this total content is less than 40% by mass, the degree of crystallization of the glass in the sintered body after the sealing and sintering is insufficient, so that the residual ratio of the glass phase based on the crystal phase may increase.

Specifically, if the total of the MgO content and the CaO content is less than 40% by mass, due to an increase in the residual ratio of the glass phase, the sintered body may not exhibit a sufficient strength, which may make it easier for a reaction with the oxide electrode to occur.

On the other hand, if the total of the MgO content and the CaO content exceeds 54% by mass, the glass-network-forming components, such as $SiO_2$ and $B_2O_3$, are insufficient so that stability during production of the raw glass may deteriorate.

Therefore, the total of the MgO content and the CaO content is usually set at 40% by mass or more, and preferably 42% by mass or more.

Further, the upper limit is usually set at 54% by mass, preferably 50% by mass, and especially preferably 48% by mass.

Specifically, the total of the MgO content and the CaO content is usually set at 40 to 54% by mass, preferably 40 to 50% by mass, especially preferably 42 to 50% by mass, and most preferably 42 to 48% by mass.

Regarding the glass powder contained in the sealing material according to the present embodiment, it is not necessary for all of the glass powders to have the same composition ratio expressed in terms of oxide, and the glass powder may be formed by blending a plurality of glass powders having different component ratios.

In this case, a part of the glass powder may be formed from a glass composition having a different composition ratio to that described above, as long as the overall composition ratio matches that described above.

In addition, in the present embodiment, as long as the above-described relationships among the respective contents of the $SiO_2$, $Al_2O_3$, $B_2O_3$, MgO, and CaO are satisfied in the sealing glass composition, a neutral component that does not have a large effect on the physical properties of the obtained raw glass or the crystallized glass can be added within a range that does not substantially harm the advantageous effects of the present invention. Cases in which such a neutral component is contained are also within the scope intended by the present invention.

Examples of such a component include SrO, ZnO, $ZrO_2$, $La_2O_5$, $TiO_2$, BaO, $CeO_2$, $Y_2O_3$ and the like.

If the total content of these components is 3% by mass or less, there is usually no substantial adverse impact during the sintering carried out for sealing or on the sintered crystallized glass even if these components are contained as a glass composition component.

On the other hand, it is preferred that $P_2O_5$ and the like are substantially not contained, because although $P_2O_5$ and the like make it easier to stabilize the glass state when producing the raw glass, such components generate a split phase in the sintered crystallized glass, and cause the acid resistance to substantially deteriorate.

Further, it is preferred that a transition metal element component from Groups 5 to 11, especially a Cu component, is substantially not contained, because such a component tends to increase the electrical conductivity of glass in a high temperature region, and is thus not suited as a sealing material for a solid oxide fuel cell, which needs to have insulating properties.

Moreover, it is preferred that an alkali metal component, such as Na and K, is substantially not contained, because such a component also tends to improve the electrical conductivity in a high temperature region.

In the present specification, the expression "substantially not contained" is not intended to preclude cases in which such components are contained at the level of impurities. For example, this expression is construed as permitting such a component to be contained at the level of impurities in the raw materials and the like used to produce the raw glass.

More specifically, there is little risk of any problems even if the above-described components are contained as long as the total content, expressed in terms of oxide, is 1,000 ppm or less, which corresponds to the case where they are substantially not contained.

However, from the perspective of more reliably preventing the above-described problems from occurring, expressed in terms of oxide, at the very least, it is preferable that the content of a Cu component is less than 100 ppm, more preferable that the total content of transition metal element components from Groups 5 to 11 is 100 ppm or less, and especially preferable that the total content is 30 ppm or less.

Further, in the present invention, it is preferred to adjust the glass composition formed from the above-described components so that the difference (Tx−Ts) between the crystallization peak temperature (Tx) and the softening point (Ts) is 90° C. or more.

The reason why it is preferred that the difference (Tx−Ts) between the crystallization peak temperature and the softening point is 90° C. or more is because if this difference is less than 90° C., the fluidity during the sintering is insufficient, which can prevent a dense sintered body from being obtained and can form gaps between the sintered body and the sealing target, such as a metal or a ceramic.

To more reliably prevent this problem, it is preferred that the difference (Tx−Ts) is 95° C. or more.

Although the upper limit for the value of this difference (Tx−Ts) is not especially limited, the value is usually set at 140° C.

The crystallization peak temperature (Tx) can be determined by, for example, performing differential thermal analysis (DTA) on a sample of about 40 mg at a rate of temperature increase of about 20° C./min, and measuring the peak temperature of the first exothermic peak appearing on the temperature side that is higher than the softening point (Ts).

Next, the glass powder and the sealing material containing the glass powder will be described.

To form the glass powder with a sealing glass composition like that described above, the metal oxides serving as the raw materials may be prepared, mixed, and melted (e.g., at 1,400 to 1,550° C.). The resultant composition is then cooled to obtain a raw glass (that has not crystallized), which is subjected to dry crushing to produce a glass powder.

Further, in the present embodiment, the glass powder needs to have a high fluidity during the sintering, because during the sintering the glass powder has to wet the surface of the metal or ceramic while softening and flowing after temporarily contracting.

To achieve this, the particle size is adjusted by the conditions in the dry crushing so that the average particle size is preferably 7 to 40 μm, and more preferably 7 to 10 μm, and so that the maximum particle size is 250 μM or less.

If, for example, the average particle size exceeds 40 μm, the degree of crystallization after the sealing and sintering does not increase, and the residual ratio of the glass phase based on the crystal phase increases, so that heat resistance deteriorates. Therefore, an average particle size of more than 40 μm is not preferable.

Further, if the average particle size is less than 7 μm, the ratio of fine powders increases, and the fluidity for wetting the surface of the metal and ceramic deteriorates. Therefore, an average particle size of less than 7 μm is not preferable.

In addition, if the average particle size is less than 7 μm, crystallization from the powder surface during the sintering proceeds more quickly, so that the crystallization peak temperature (Tx) tends to deteriorate, which tends to cause the difference (Tx−Ts) between the crystallization peak temperature and the softening point to deteriorate. For this reason too, an average particle size of less than 7 μm is not preferable.

Moreover, if the average particle size is less than 7 μm, the adhesion and the sealing among the powders during the sintering is inhibited, so that air bubbles can form inside the sintered body. From this perspective too, an average particle size of less than 7 μm is not preferable.

A wet crushing method is not preferable as the method used to obtain the glass powder, because water, an organic solvent or the like is used to suppress glass powders from sticking to each other during the crushing to increase crushing efficiency in the wet crushing method and thus the ratio of fine powders tends to be higher as compared with the dry crushing.

Further, in the wet crushing, the surface of the glass powder reacts with water, organic solvent or the like by a mechanochemical reaction, and crystallization during the sintering starts earlier. Consequently, fluidity deteriorates and air bubbles form inside the sintered body. For this reason too, the wet crushing is not preferable.

Specifically, it is preferred to employ a dry crushing method as the method used to obtain the glass powder.

If the glass powder is a fine powder with an excessively small particle size, crystallization starts earlier and the fluidity of the composition during the sealing and sintering deteriorates, so that the flow is inhibited. This makes it necessary to increase the number of times the sealing material is applied and sintered, thereby leading to an increase in production costs. Therefore, such a fine powder is not preferable.

On the other hand, if the glass powder is a coarse powder with an excessively large particle size, when forming the powder into a paste, or when applying and drying the powder, the problems are that the powder particles separate by sedimentation and that strength deteriorates due to crystallization tending to be uneven and insufficient.

From these perspectives, it is preferred to adjust the particle size by removing the fine and coarse powders by an operation such as classification.

Specifically, it is preferred to perform a classification operation so that the maximum particle size is 250 μm or less, more preferably 200 μm or less, and especially preferably 150 μm or less, while adjusting the average particle size to 7 μm or more to 40 μm or less, and preferably 10 μm or less.

As already stated, this glass powder can form the sealing material alone or with a ceramic powder (ceramic filler).

Containing such a ceramic powder allows the thermal expansion coefficient to be finely adjusted and the strength of the sintered glass to be improved.

However, it is preferred to contain this ceramic powder in the sealing material in a content that does not have a large effect on the fluidity during the sintering.

Specifically, based on a total content of the glass powder and the ceramic powder of 100% by mass, a desirable effect cannot be expected if the ceramic powder content is less than 0.01% by mass, while the fluidity may be inhibited if the ceramic powder content exceeds 5% by mass.

In view of this, the content of the ceramic powder is preferably set at 0.01 to 5% by mass based on the total content of the glass powder and the ceramic powder, more preferably 0.03 to 5% by mass, and especially preferably 0.03 to 1% by mass.

Examples of the ceramic filler include, but are not limited to, powders of quartz, alumina, zirconia, magnesia and the like.

The ceramic filler preferably has an average particle size of 20 μm or less, more preferably 5 μm or less, and even more preferably 3 μm or less, and a maximum particle size of 106 μM or less, more preferably 45 μm or less, and even more preferably 22 μm or less.

The sealing material according to the present embodiment can be used for sealing between the cells in a solid oxide fuel cell and a member made from a metal such as SUS to be attached thereto in the form of a paste in which the above-described glass powder and ceramic powder (ceramic filler)

are dispersed in a binder or in the form of a slurry in which these components are dispersed in a solvent.

Especially, since the sealing material according to the present embodiment uses a glass powder that is formed from the above-described glass composition, the thermal expansion coefficient of the sintered body is suitable for this kind of sealing.

Specifically, the thermal expansion coefficient at 50 to 550° C. of the sintered crystallized glass can be set at 95 to $120 \times 10^{-7}$/° C.

Further, due to the use of a glass powder formed from the above-described glass composition, the post-sintering thermal expansion coefficient is in a suitable state for a solid oxide fuel cell, and even when a perovskite oxide, such as LSCF ($La_{0.8}Sr_{0.4}Cu_{0.2}Fe_{0.8}O_3$, etc.), LSC ($La_{0.6}Sr_{0.4}Co_{1.0}O_3$, etc.), and LSM ($La_{0.6}Sr_{0.4}MnO_3$), is used as an oxide electrode material or a constituent material for an interconnector, reactions with such a perovskite oxide during the sintering are suppressed.

If the above-described perovskite oxide and the glass react during the sintering, not only does the electrical conductivity of the perovskite oxide deteriorate, but the insulating properties of the glass sintered body may also deteriorate.

Further, since the glass composition does not substantially contain a transition metal element from Groups 5 to 11 or an alkali metal, excellent insulating properties can be given to the sealing material of a solid oxide fuel cell.

Such a sealing material can be used in a similar manner to a conventional sealing material. For example, the sealing material can be applied onto the target by printing or with a dispenser, and then sintered at 850 to 1,100° C.

Further, a molding obtained by mixing with a molding auxiliary, molding in a dry press, and then calcining at a temperature close to the softening point of the glass can also be used together with the above-described paste.

During such uses, as described above, since the reactivity between the sealing glass composition according to the present invention and an oxide electrode material, an interconnector material or the like is suppressed, sintering can be carried out by directly applying the sealing material onto the interconnector material or the electrode material without providing a buffer layer to suppress reactions. Consequently, a simplification in the steps can be achieved.

Although not described in detail here, conventionally-known technical matters relating to the glass powder and other materials contained in the sealing material may also be employed in the present invention to the extent that the advantageous effects of the present invention are not substantially harmed. The present invention is not limited to the above-described examples.

EXAMPLES

The present invention will now be described in more detail with reference to Examples. However, the present invention is not limited to these.
[Production of Raw Glass and Glass Powder]

Examples 1 to 9 and Comparative Examples 1 to 7

Raw materials were prepared and mixed so as to form the glass compositions shown in Tables 1 and 2. The prepared raw materials were placed in a platinum crucible and melted for 2 hours at 1,400 to 1,550° C., whereby glass flakes of the raw glass were obtained.

The glass flakes were placed in a pot mill, and crushed while adjusting the average particle size to 7 to 40 µm. Coarse grains were then removed with a sieve having openings of 106 µm to obtain the glass powders (sealing materials) of Examples and Comparative Examples.

In Example 5, a quartz powder (average particle size of 1.3 µm) was added to the glass powder, and the mixture was evaluated as the sealing material.
[Test Methods]

The "average particle size", the "softening point", and the "crystallization peak temperature" of the sealing materials (glass powders) of Examples and Comparative Examples were measured based on the following methods. Further, the "thermal expansion coefficient" and the "LSCF resistance" of the sintered bodies were evaluated based on the following methods.

(1) Glass Powder Average Particle Size

The $D_{50}$ value in volume distribution mode was determined using a laser scattering particle size distribution analyzer (Microtrac HRA, manufactured by Nikkiso Co., Ltd.).

(2) Softening Point and Crystallization Peak Temperature

About 40 mg of sealing material (for Example 5, a mixture of glass powder and ceramic powder, for the others, glass powder) was filled in a platinum cell, and the softening point (Ts) and the crystallization peak temperature (Tx) were measured by increasing the temperature from room temperature at 20° C./min using a DTA measurement apparatus (Thermo Plus TG8120, manufactured by Rigaku Corporation).

Examples in which (Tx−Ts) was less than 90° C. were marked with a "x" next to the measurement value, as those may have a problem with fluidity during the sintering.

(3) Thermal Expansion Coefficient

The obtained power was molded with a dry press, and then sintered at 1,100° C.

The obtained sintered body was cut into a roughly 5×5×15 mm piece to produce a test specimen.

The thermal expansion coefficient (α) based on two points, 50° C. and 550° C., of the test specimen was determined from a thermal expansion curve obtained when the temperature was increased from room temperature at 10° C./min using a TMA measurement apparatus (Thermo Plus TMA8310, manufactured by Rigaku Corporation).

Examples having a thermal expansion coefficient of less than $95 \times 10^{-7}$/° C. were marked with a "x" (fail) next to the measurement value, as those have a problem in terms of matchability with metal, ceramic and the like.

(4) LSCF Resistance

A paste mixed with an LSCF powder was applied onto an upper portion of the sintered body obtained in the above (3), and sintered at 1,100° C.

The sintered body was cut, and the sintered body interface with the LSCF and the sintered body surface were observed to check whether a chemical reaction had occurred. Examples in which a reaction with the LSCF had substantially not occurred were marked with a "⊙" (very good), Examples in which corrosion into the sintered body with the LSCF was less than 1 mm were marked with a "O" (pass), and Examples in which corrosion into the sintered body was 1 mm or more or in which discoloration in the sintered body was observed were marked with a "x" (fail). The results are shown in Tables 1 and 2.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Glass Powder Composition (% by mass) | SiO$_2$ | 48.7 | 45.8 | 51 | 49 | 49 | 49 | 49 | 49 | 40.6 |
| | Al$_2$O$_3$ | 4.7 | 4.4 | 4.4 | 3.6 | 3.6 | 3.6 | 3.6 | 3.6 | 3.6 |
| | B$_2$O$_3$ | 2.9 | 5.5 | 0 | 5.2 | 5.2 | 5.2 | 5.2 | 5.2 | 1.8 |
| | MgO | 20.3 | 22.3 | 22.4 | 28.5 | 28.5 | 28.5 | 28.5 | 28.5 | 30 |
| | CaO | 23.4 | 22 | 22.2 | 13.7 | 13.7 | 13.7 | 13.7 | 13.7 | 24 |
| | Total | 100 | 100 | 100 | 100 | 100 | 100 | 100 | 100 | 100 |
| | MgO + Cao | 43.7 | 44.3 | 44.6 | 42.2 | 42.2 | 42.2 | 42.2 | 42.2 | 54 |
| Ceramic Powder | Addition (type) | No | No | No | No | Yes (quartz) | No | No | No | No |
| | Amount To Be Added (% by mass) | — | — | — | — | 1 | — | — | — | — |
| Thermal Expansion Coefficient (×10$^{-7}$/° C.) | | 96(○) | 96(○) | 99(○) | 97(○) | 95(○) | (90)* | 95(○) | 97(○) | 108(○) |
| LSCF Resistance | | ⊙ | ⊙ | ⊙ | ⊙ | ⊙ | ⊙ | ⊙ | ⊙ | ⊙ |
| Average Particle Size (μm) | | 7 | 7 | 7 | 7 | 7 | 2 | 14 | 37 | 8 |
| Tx − Ts (° C.) | | 99 | 102 | 103 | 103 | 91 | 85(X) | 113 | 111 | 121 |

*Due to the presence of air bubbles, thermal expansion coefficient measurement value was apparently lower than that of Example 4.

TABLE 2

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Glass Powder Composition (% by mass) | SiO$_2$ | 48.7 | 40.9 | 51.7 | 40.6 | 40.6 | 59.5 | 35 |
| | Al$_2$O$_3$ | 3.6 | 3.9 | 0.5 | 3.6 | 3.6 | 0.5 | 4.7 |
| | B$_2$O$_3$ | 7.8 | 9.9 | 7.8 | 7.8 | 7.8 | 0 | 7.8 |
| | MgO | 28.4 | 25.6 | 16 | 20 | 38 | 20 | 28.5 |
| | CaO | 11.5 | 19.7 | 24 | 28 | 10 | 20 | 24 |
| | Total | 100 | 100 | 100 | 100 | 100 | 100 | 100 |
| | MgO + Cao | 39.9 | 45.3 | 40 | 48 | 48 | 40 | 52.5 |
| Ceramic Powder | Addition (type) | No | No | No | No | No | No | No |
| | Amount To Be Added (% by mass) | — | — | — | — | — | — | — |
| Thermal Expansion Coefficient (×10$^{-7}$/° C.) | | 87(X) | 99(○) | 90(X) | 98(○) | 99(○) | 91(X) | 107(○) |
| LSCF Resistance | | ○ | X | ○ | X | X | ⊙ | X |
| Average Particle Size (μm) | | 8 | 7 | 10 | 8 | 7 | 8 | 9 |
| Tx − Ts (° C.) | | 91 | 102 | 138 | 103 | 140 | 119 | 154 |

As can be seen in these tables, the sealing material of the Examples satisfies both the thermal expansion coefficient and the LSCF resistance items. On the other hand, the sealing material of the Comparative Examples fails one(s) of these items.

In Example 6, air bubbles were present in the interior of the sintered body when sintering was carried out at 1,100° C.

Measurement of the thermal expansion coefficient of this air-bubble-containing sintered body showed a lower value than that of Example 4, which had the same composition.

This is thought that due to the presence of the air bubbles, the apparent thermal expansion coefficient was observed to be lower than the actual thermal expansion coefficient.

Air bubbles were not found in the sealing material of the other Examples or Comparative Examples ("glass powder", "mixture of glass powder and ceramic powder (Example 5)").

Specifically, this fact also showed that setting an average particle size to 7 μm or more is important in obtaining a good sintered body.

The invention claimed is:

1. A sealing material used for sealing a solid oxide fuel cell, comprising a glass powder comprising a glass composition having a composition ratio of, expressed in terms of oxide, 40 to 55% by mass of SiO$_2$, 0 to 5.0% by mass of Al$_2$O$_3$, 0 to 8.0% by mass of B$_2$O$_3$, 20 to 30% by mass of MgO, and 10 to 24% by mass of CaO, wherein a total of the MgO and the CaO is 40 to 54% by mass, wherein the glass powder has an average size of 7 to 40 μm.

2. The sealing material according to claim 1, wherein the glass composition has a composition ratio of, expressed in terms of oxide, 40 to 52% by mass of SiO$_2$, 0.5 to 5.0% by mass of Al$_2$O$_3$, 0 to 8.0% by mass of B$_2$O$_3$, 20 to 30% by mass of MgO, and 10 to 24% by mass of CaO, wherein a total of the MgO and the CaO is 40 to 50% by mass.

3. The sealing material according to claim 1, further comprising a ceramic powder in addition to the glass powder, wherein a proportion of the glass powder is 95% by mass or more to less than 100% by mass and a proportion of the ceramic powder is more than 0% by mass to 5% by mass or less, based on a total amount of the glass powder and the ceramic powder.

4. The sealing material according to claim 1, wherein a difference between a softening point (Ts) and a crystallization peak temperature (Tx) of the glass powder is 90° C. or more.

5. The sealing material according to claim 2, further comprising a ceramic powder in addition to the glass powder, wherein a proportion of the glass powder is 95% by mass or more to less than 100% by mass and a proportion of the ceramic powder is more than 0% by mass to 5% by mass or less, based on a total amount of the glass powder and the ceramic powder.

6. The sealing material according to claim 2, wherein a difference between a softening point (Ts) and a crystallization peak temperature (Tx) of the glass powder is 90° C. or more.

7. The sealing material according to claim 3, wherein a difference between a softening point (Ts) and a crystallization peak temperature (Tx) of the glass powder is 90° C. or more.

* * * * *

UNITED STATES PATENT AND TRADEMARK OFFICE
CERTIFICATE OF CORRECTION

| | | |
|---|---|---|
| PATENT NO. | : 8,741,792 B2 | Page 1 of 1 |
| APPLICATION NO. | : 13/580519 | |
| DATED | : June 3, 2014 | |
| INVENTOR(S) | : Akamatsu et al. | |

It is certified that error appears in the above-identified patent and that said Letters Patent is hereby corrected as shown below:

In the Claims

Column 12, Line 57, Claim 1, after "average" insert -- particle --

Signed and Sealed this
Twenty-third Day of September, 2014

Michelle K. Lee
*Deputy Director of the United States Patent and Trademark Office*